United States Patent [19]
Katchka

[11] Patent Number: 6,010,327
[45] Date of Patent: Jan. 4, 2000

[54] FUEL CONTROL SYSTEM, PARTS, AND METHODS OF MAKING

[75] Inventor: Jay Katchka, Cypress, Calif.

[73] Assignee: Robertshaw Controls Company, Richmond, Va.

[21] Appl. No.: 08/813,956

[22] Filed: Mar. 3, 1997

[51] Int. Cl.[7] .............................. F23N 5/00; F16L 35/00
[52] U.S. Cl. .............................. 431/75; 431/53; 431/60; 137/614.06; 285/24; 285/405; 285/382.4; 285/404
[58] Field of Search .................. 431/75, 80, 54, 431/53, 60, 154; 137/65, 66, 335, 614.03, 614.04, 614.05; 361/162; 285/124.1, 319, 404, 331, 24, 27, 405, 407, 918, 382.4, 334.5; 236/21 R, 21 B; 126/361, 373

[56] References Cited

U.S. PATENT DOCUMENTS

| | | | |
|---|---|---|---|
| 2,052,394 | 8/1936 | Fullman | 285/404 |
| 2,628,850 | 2/1953 | Summerville | 285/124.1 |
| 2,983,506 | 5/1961 | Bertsch et al. | 285/124.1 |
| 3,402,887 | 9/1968 | Visos | 236/21 R |
| 3,507,037 | 4/1970 | Dykzeul | 236/21 R |
| 3,508,708 | 4/1970 | Caparone et al. | 137/315 |
| 3,615,160 | 10/1971 | Feather | 285/334.5 |
| 3,841,552 | 10/1974 | Kinsella et al. | 431/54 |
| 3,888,519 | 6/1975 | Smith et al. | 285/334.5 |
| 3,971,344 | 7/1976 | Gouyou-Beauchamps | 431/75 |
| 4,194,765 | 3/1980 | Reddy | 285/27 |
| 4,285,662 | 8/1981 | Katchka et al. | 431/53 |
| 4,327,770 | 5/1982 | Brown et al. | 137/614.05 |
| 4,407,482 | 10/1983 | Daghe et al. | 285/334.5 |
| 4,872,830 | 10/1989 | Katchka et al. | 431/54 |
| 4,911,194 | 3/1990 | Lechner | 137/614.04 |
| 5,261,438 | 11/1993 | Katchka | 285/27 |
| 5,283,951 | 2/1994 | Davenport et al. | 285/334.5 |
| 5,324,083 | 6/1994 | Vogelsang | 285/110 |
| 5,326,029 | 7/1994 | Schultz | 137/66 |
| 5,464,256 | 11/1995 | Godeau | 285/124.1 |

*Primary Examiner*—Ira S. Lazarus
*Assistant Examiner*—Josiah C. Cocks
*Attorney, Agent, or Firm*—Terrence Martin; Jules J. Morris; Sean D. Detweiler

[57] ABSTRACT

A fuel control system, parts therefor, and methods of making are provided. The fuel control system includes a fuel control valve unit (FCU) and a fuel conduit having an end secured in a fuel outlet opening in a housing of the fuel control valve unit. The end of the conduit is disposed in a certain desired axial position in the fuel outlet opening relative to the housing, the housing has a movable part. In a first position of the movable part, the end of the conduit can be axially moved from a position outside the housing to the certain desired axial position. In a second position, the movable part cooperates with a securing device on the end of the conduit to secure the end in the certain desired axial position thereof.

20 Claims, 5 Drawing Sheets

FUEL CONTROL SYSTEM, PARTS, AND METHODS OF MAKING

FIELD OF THE INVENTION

This invention relates to a new fuel control system and to new parts for such a fuel control system. A new method of making such a fuel control system and such parts are also disclosed.

BACKGROUND OF THE INVENTION

A fuel control system including a fuel control valve unit having a fuel outlet opening in a housing is known. A fuel conduit having an end secured in the fuel outlet opening for conveying fuel from the fuel outlet opening to a predetermined location in the system is also known. It is preferable that the end of the conduit be in a certain desired axial position in the fuel outlet opening relative to the housing. The housing having a securing device, the end of the conduit having another securing device cooperating with the housing securing device to secure the end and the housing together in the certain axial position thereof are known. A housing securing device comprising an internally threaded portion of the housing at the outlet opening thereof and the conduit securing device having a threaded nut threaded into the threaded part of the housing are also known. For example, see U.S. Pat. No. 4,285,662 to Katchka et al and U.S. Pat. No. 3,508,708 to Caparone et al.

SUMMARY OF THE INVENTION

One feature of the present invention provides a new fuel control system wherein a fuel conduit can be secured to the housing of the fuel control valve unit of the system in a relatively rapid, safe, simple, and effective manner in contrast to the time consuming prior convention spud threading operation.

In particular, it has been found according to the teachings of the present invention that an end of a fuel conduit can be provided with a unique securing device that cooperates with a unique securing device on a housing to permit the conduit end to be axially moved from a position outside the housing to a certain desired axial position in the fuel outlet opening. A movable portion of the housing securing device cooperates with another securing device on the end of the conduit to secure the end in that certain axial position thereof.

In one embodiment for example, the present invention contemplates a fuel control system including a fuel control valve unit (FCU) having a housing enclosing a fuel outlet opening, and a fuel conduit having an end secured in the fuel outlet opening for conveying fuel from the fuel outlet opening to a predetermined location in the system. The end of the conduit is disposed in a certain desired axial position in the fuel outlet opening relative to the housing. The housing has its own securing device, the conduit end has its own securing device which cooperates and mates with the housing securing device to secure the end and the housing together in the certain desired axial position thereof. The housing securing device has movable portions which, in a first position thereoof permit the end to be axially moved from outside the housing into the certain desired axial position. In a second position, the housing securing device cooperates with the end securing device to secure the end in the certain desired axial position.

Accordingly, it is an object of this invention to provide a new fuel control system having one or more of the novel features of this invention as set forth above or hereinafter shown or described.

Another object of this invention is to provide a new method of making such a fuel control system, the method of this invention having one or more of the novel features of this invention as set forth above or hereinafter shown or described.

Other objects, uses and advantages of this invention are apparent from a reading of this description with reference to the accompanying drawings forming a part thereof and wherein:

DESCRIPTION OF THE PREFERRED EMBODIMENT

Figure 1:
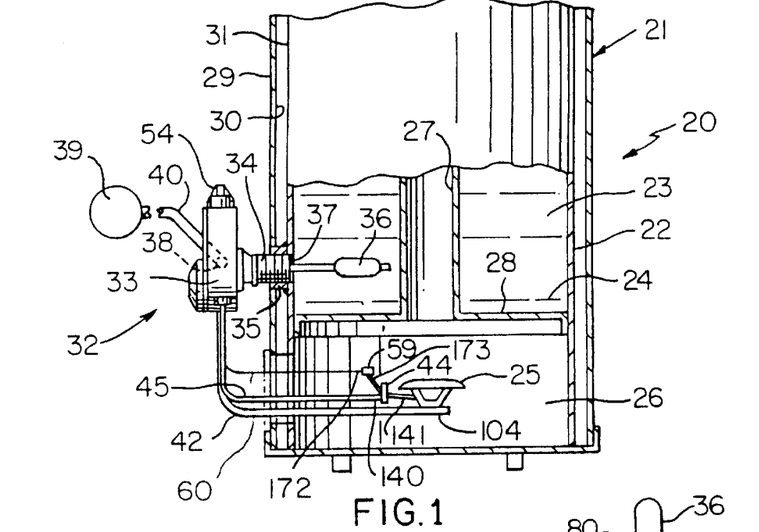
FIG. 1 is a fragmentary schematic view, partially in cross section, and illustrates the fuel control system of this invention.

Referring now to FIG. 1, the fuel control system of the present invention is generally indicated by the reference numeral 20. As shown, it is utilized for controlling the operation of a water (or other fluid) heater that is generally indicated by the reference numeral 21, comprising an inner tank 22 having a chamber 23 for containing a fluid 24 such as water to be heated by a main burner 25 disposed in a combustion chamber 26 for the water heater 21 in a manner well known in the art. The tank 22 includes a central flue 27 extending upwardly from a bottom wall 28 of chamber 23 for permitting burner 25 combustion products to pass upwardly and be carried away in a conventional manner. For example, see U.S. Pat. No. 5,261,438 to Katchka, the teaching of which is hereby incorporated herein by reference.

To provide insulation for tank 22, water heater 21 has an outer jacket 29 surrounding tank 22. Any suitable insulation (not shown) can be disposed between a wall 30 of jacket 29 and a wall 31 of tank 22, also as well known in the art.

Fuel control system 20 of the present invention includes a fuel control unit (FCU) generally indicated by the reference numeral 32 in FIG. 1. It includes a housing 33 having an externally threaded shank 34 engaged with an internally threaded spud 35 carried by tank wall 31. A temperature sensing rod and tube arrangement 36 passes through an opening 37 in wall 31 such that the rod and tube arrangement is received in chamber 23. Rod and tube arrangement 36 is thus disposed for sensing the fluid or water 24 temperature and to operate a valve (not shown) in housing 33 in relation to such temperature in a manner generally well known in the art. For example, reference is made to U.S. Pat. Nos. 4,285,664 and 4,872,830 to Katchka et al, the teaching of these two patents being incorporated herein by reference.

The FCU (FCU: 32) housing 33 is formed of any suitable fireproof, preferably metallic material. An inlet 38, FIG. 4, is connected therefrom to a fuel source 39 by a conduit 40 threaded into inlet 38 so that under certain conditions, FCU 32 can connect fuel source 39 to an outlet opening passageway 41, FIG. 4, of housing 33 so as to connect main burner 25 to a fuel conduit 42 as set forth hereinafter.

Similarly, FCU 32 connects fuel source 39 to another housing 33 outlet opening 43 under certain conditions with outlet opening 43 being connected to a pilot burner 44 by another fuel conduit 45 as set forth herein after. Pilot burner 44 is adapted to produce a flame for subsequently igniting fuel issuing from main burner 25 as is well known in the art.

Figure 4:
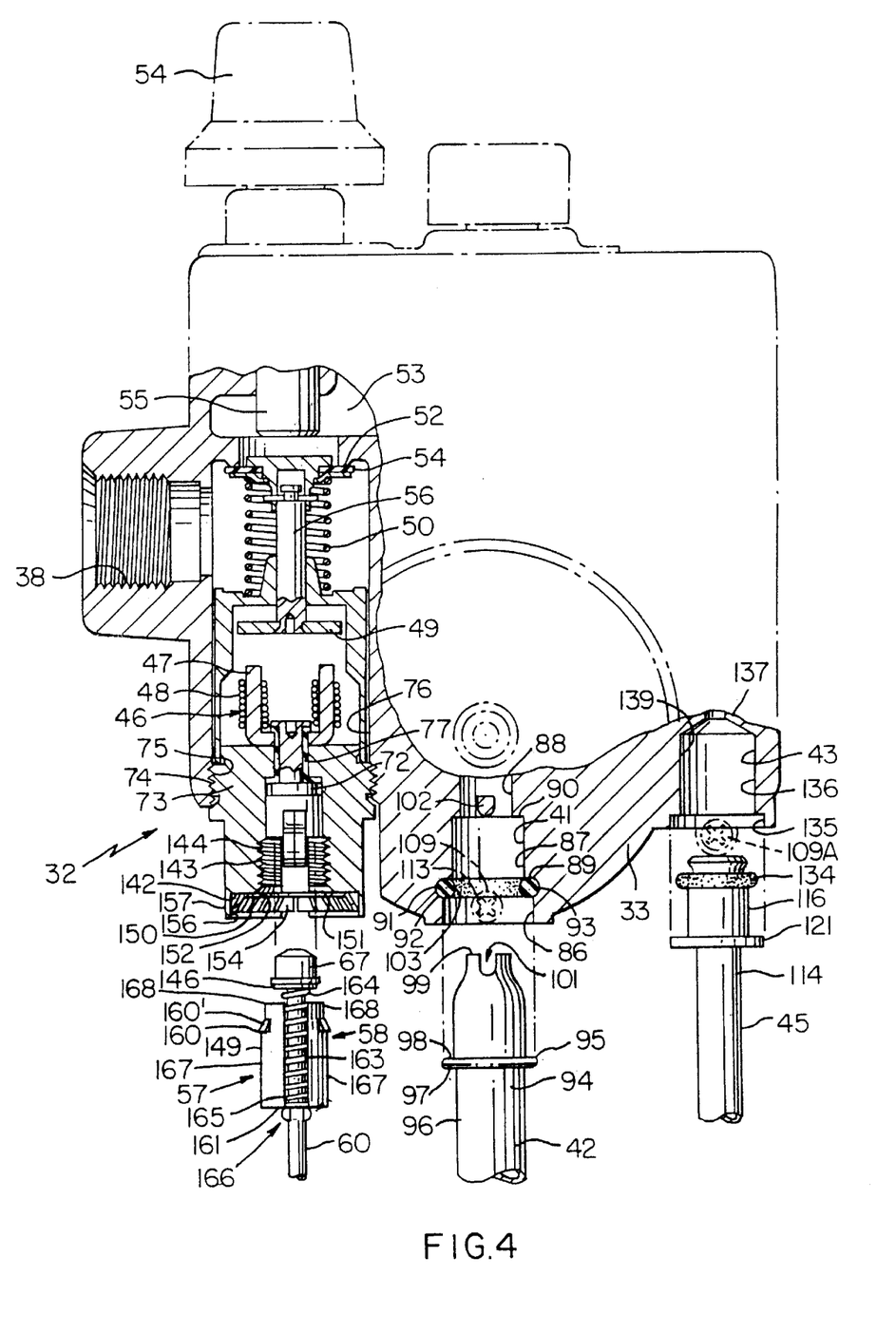
FIG. 4 is an enlarged fragmentary exploded view of various parts of the fuel control valve unit of FIG. 3 with a part of the housing thereof being in cross section.

The FCU housing 33 illustrated in FIG. 4 carries a thermocouple operated unit 46. This unit 46 has an electromagnet with a core 47 having an electrical wire coil 48 disposed thereon so that when an electric current passes through the coil 48 and generates an electromagnetic field, armature 49 will be held adjacent core 47 in opposition to a compression spring 50 force that normally urges valve member 51 against valve seat 52 to prevent fuel at inlet 38 from reaching chamber 53 in the housing connected to pilot outlet opening 43 and main burner outlet opening 41 through a valve (not shown) controlled by the rod and tube temperature sensing arrangement 36 as known in the art. For example, reference is made to U.S. Pat. No. 3,508,708 to Caparone et al, the teaching of which is hereby incorporated by reference.

Compression spring 50 normally urges valve member 51 to its closed position against valve seat 52 so that no fuel from inlet 38 can reach chamber 53, and thus burners 25, 44, until valve member 51 is moved away from valve seat 52 in opposition to the urging force of compression spring 50. Start up is accomplished by applying a downward pressure on a control knob 54 of FCU 32. Plunger 55 is thus moved downward and against valve member 51 which is also moved downward so that armature 49 (connected to valve member 51 by a rod 56 or like coupling) is positioned adjacent core 47 of thermocouple operated unit 46. With armature 49 held in the down position by plunger 55, application of continuing electrical current through coil 48 causes armature 49 to be held in this down position adjacent core 47 even after plunger 55 is released. Plunger 55 is returned to the position illustrated in FIG. 4 by a spring force (not shown). Valve member 51 is thereby held in an open position communicating inlet 38 to chamber 53 as is well known in the art.

However, should electrical current cease to pass through coil 48 for any reason, thermocouple operated unit 46 will cease to operate and the urging force from compression spring 50 will drive valve member 51 upward to its closed position against valve seat 52, thereby terminating the flow of fuel through FCU 32 such that burners 25, 44 can no longer operate.

Figure 2:
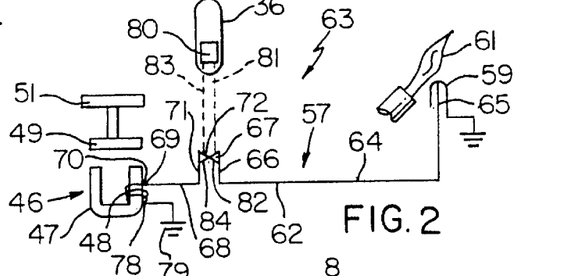
FIG. 2 is a schematic view illustrating the electrical circuit for the thermocouple portion of the system of FIG. 1.
Figure 3:
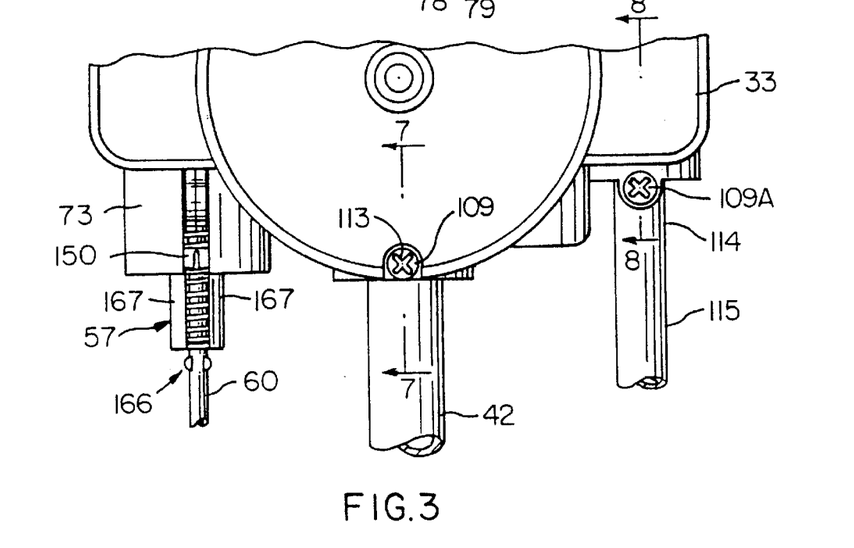
FIG. 3 is an enlarged fragmentary front view of a portion of the fuel control valve unit that forms part of the fuel control system of FIG. 1.

Fuel control system 20 of the present invention also includes a thermocouple apparatus 57 as shown in FIGS. 1–3. The thermocouple apparatus 57 functions the same as conventional thermocouples known in the art. Thermocouple apparatus 57 has a unique tip end configuration generally indicated by the reference numeral 58 in FIG. 4. The structure of this end configuration facilitates connection of thermocouple apparatus 57 to housing 33 in a novel manner as hereinafter set forth.

Thermocouple apparatus 57 includes flame detecting apparatus such as a thermocouple 59 per se disposed at one an end of another rod 60 or like coupling that is opposite end 58 thereof. Thermocouple 59 is adapted to be disposed adjacent pilot burner 44 so that when a continuing flame 61 (see FIG. 2) appears at pilot burner 44 (continuously supplied fuel by the FCU 32), thermocouple 59 generates an electrical current (well known in the art) that flows in electrical line 62 of circuit 63 as illustrated in FIG. 2. Thermocouple 59 is adapted to generate a sufficient flow of electrical current as long as flame 61 appears at pilot burner 44 to operate thermocouple operated unit 46 and effectively hold armature 49 adjacent core 47 so that valve member 51 will be held in an open condition relative to valve seat 52 as set forth above.

As illustrated in FIG. 2, electrical line 62 has a first part 64 having one end 45 electrically connected to thermocouple 59. Another end 66 is connected to an electrical contact 67 at end 58 of thermocouple apparatus 57. The electrical line 62 (FIG. 2) has a second part 68 having one end 69 connected to one end 70 of coil 48 and another end 71 connected to contact 72 of thermocouple operated unit 46. Contact 72 is carried by a metallic fitting 73 (FIG. 4) having an externally threaded section 74 to engage an internally threaded section 75 of an opening 76 in FCU 32 housing 33, whereby fitting 73 forms part of housing 33. Contact 72 is isolated from fitting 73 by insulation 77. The other end 78 of coil 48 is electrically connected to fitting 73, and thus to ground 79. This is illustrated in FIG. 2.

A temperature responsive switch 80 is disposed in rod and tube temperature sensing arrangement 36. It has one terminal 81 electrically connected to contact 82 in contact with contact 67 of the thermocouple apparatus 57 and another terminal 83 electrically connected to contact 84 in electrical contact with contact 72 of fitting 73. As long as switch 80 is closed, electrical current can flow from thermocouple apparatus 57 to thermocouple operated unit 46 coil 48. However, should switch 80 open, the current to coil 48 will be interrupted. Switch 80 opens upon detection of a predetermined high temperature limit such as, for example, approximately 195 degrees F. Compression spring 50 will then drive valve member 51 upward to close against valve seat 52 as illustrated in FIG. 4. This will terminate fuel flow to burners 25, 44 as previously set forth. Operation of high temperature limit switch 80 is well known in the art. For example, attention is drawn to U.S. Pat. No. 4,285,662 to Katchka et al.

Figure 6:
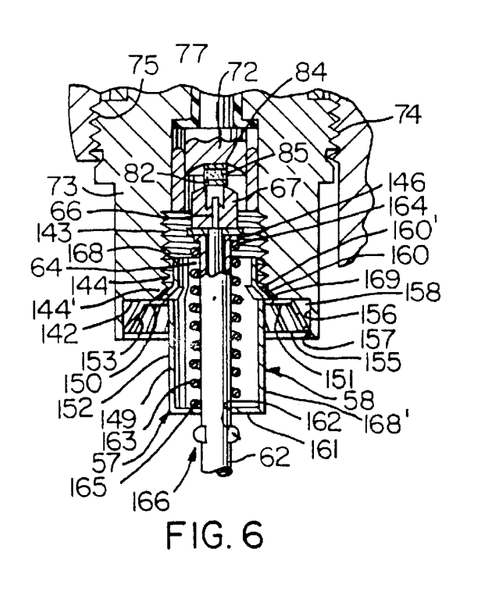
FIG. 6 is an enlarged fragmentary cross-sectional view that illustrates the thermocouple assembled to the fuel control valve unit housing.

Referring now to FIG. 6, circuit 63 (FIG. 2) is connected from end 66 of part 64 of line 62 to contact 67 at end 58 of thermocouple apparatus 57. Therefore, part 64 of the line 62 forms part of the thermocouple apparatus 57. In FIG. 6, switch 80 contacts 82 and 84 are separated from each other by electrical insulation 85. Contacts 82 and 84, respectively, are disposed in electrical contact with the contacts 67 and 72. This is done so that in order for contact 67 to be, in effect, electrically connected to contact 72, switch 80 must be closed. This closed switch condition occurs when switch 80 senses a water 24 temperature which is below the predetermined high temperature limit. Commonly, the high temperature limit is approximately 195 degrees F, in order to prevent water 24 temperature in tank 22 from exceeding this predetermined temperature limit.

An arrangement of a thermocouple in combination with a temperature sensing switch in a rod and tube temperature sensing arrangement of a fuel control unit is described in U.S. Pat. No. 4,285,662 to Katchka at al, and may also be found in U.S. Pat. No. 3,507,037 to Dykzeul, the teaching of which is incorporated herein by reference.

The fuel outlet opening 41 in FCU 32 defines three stepped cylindrical sections 86, 87, and 88 within housing 33 (FIG. 4). Cylindrical sections 86 and 87 define a flat, annular shoulder 89 therebetween; cylindrical sections 87 and 88 also define a flat, annular shoulder 90 therebetween.

The cylindrical section 86 of fuel outlet opening 41 can be interrupted by an annular groove 91 to receive the outer peripheral part 92 of a sealing O-ring 93 so that it can be carried by housing 33 (FIG. 4). O-ring 93 could as well be carried by fuel conduit 42, if desired. In this example, it has an inside diameter selected to provide a sealing relation with conduit 42 without regard to whether the O-ring 93 is carried by housing 33 or conduit 42.

The main fuel conduit 42 is formed of such suitable material as is known in the art. It has an end 94 deformed to define an integral flange 95 extending radially outward from its external peripheral surface 96, and is spaced inward from a free end 99. Flange 95 has opposed sides 97 and 98. The outflow end is necked down adjacent an arcuate portion 100 thereof as illustrated, the circumference of free end 99 being interrupted by an alignment notch or slot 101. The alignment slot, which may be U-shaped, is adapted to receive a cooperating projection 102 formed in the cylindrical section 88 of fuel outlet opening 41. Projection 102 forms an integral part of housing 33.

Figure 5:
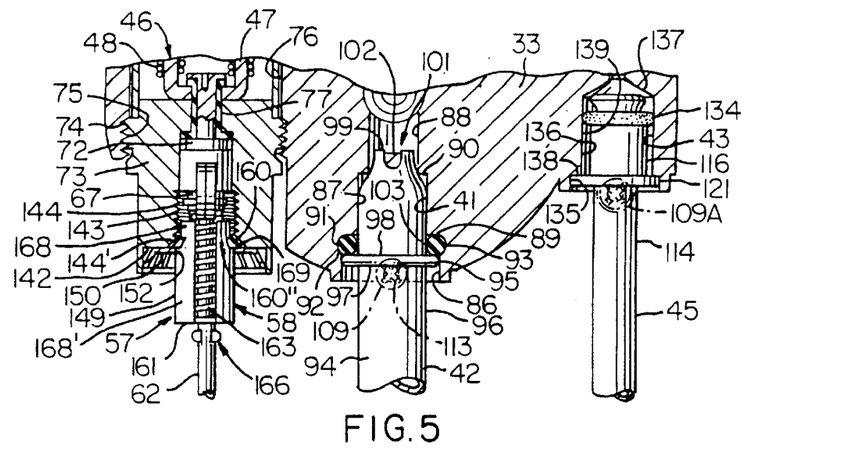
FIG. 5 is a fragmentary view similar to FIG. 4 and illustrates some of the parts shown in FIG. 4 exploded in their assembly relation to the fuel control valve unit housing of FIG. 3.

Conduit 42 end 94 is adapted to be axially moved from a position outside housing 33 (as illustrated in FIG. 4) and received within outlet opening 41, reaching a certain desired internal axial position therein (as illustrated in FIG. 5). In this latter position, the side 98 of flange 95 abuts and seals against the inward facing portion 103 of O-ring seal 93 so as to provide a tight seal as needed. In reaching this sealing position, flange 95 compresses the O-ring against both shoulder 89 of housing 33 and also against external peripheral surface 96 of conduit 42 intermediate flange 95 and the free end 99 thereof as illustrated in FIG. 5. Projection 102 of housing 33 is received in slot 101 in conduit 42 free end 99 so as to prevent rotation between conduit 42 and housing 33.

Slot 101 and projection 102 thus cooperate to rotationally orient and align conduit 42 relative to housing 33 to properly position other end 104 for connection to main burner 25.

Figure 7:
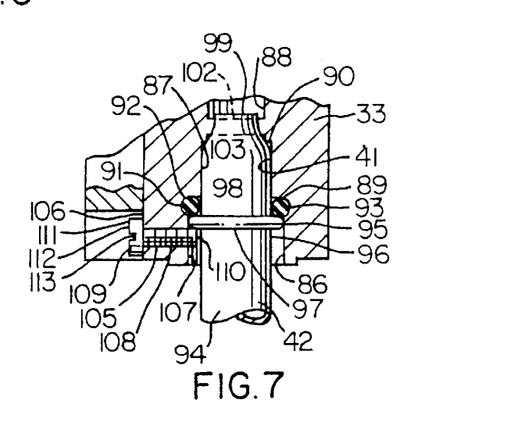
FIG. 7 is an enlarged fragmentary cross-sectional view illustrating the main fuel conduit assembled to the fuel control valve unit housing.

Fuel control valve unit 21 housing 33 includes internally threaded opening 105 leading inwards a certain distance from the annular shoulder 89 from an external surface 106 to an internal surface 107 of cylindrical section 56 of fuel outlet opening 41. This opening is provided so that shank 108 of a threaded fastener 109, which has a free end 110, extends through opening 105. Free end 110 projects sufficiently far into opening 105 to abut side 97 of conduit 42 flange 95 when it is in the desired axial position illustrated in FIGS. 5 and 7. Flange 95 holds conduit 42 end 94 in the desired axial position. The threaded fastener 109 has an enlarged head 111 which abuts against housing 33 external surface 106 in a locking relation as illustrated in FIG. 7.

Thus, by merely orienting threaded fastener 109 in the proper direction so that end 110 is disposed either flush with the surface 107 or somewhere in the threaded opening 105, threaded fastener 109 will be in a position that permits end 94 of conduit 42 to be axially moved from a position outside housing 33 to the desired axial position thereof. In this desired axial position, flange 95 is disposed against O-ring 93. Then threaded fastener 109 can be turned in the proper direction so that enlarged head 111 will be compacted against surface 106 of housing 33 and free end 110 will be disposed sufficiently adjacent side 97 of flange 95 that end 94 becomes locked in the desired axial position so as to convey fuel from outlet opening 41 to burner 25 under control of FCU 32 as needed.

It can be seen that conduit 42 flange 95 then becomes a securing mechanism for the conduit 42 while threaded fastener 109 of housing 33, in combination with threaded opening 105, becomes a securing mechanism for housing 33. The housing 33 securing mechanism has a movable part (fastener 109) which in an "out" position thereof permits conduit 42 end 94 to be axially moved to its certain desired axial position in the outlet opening 41. Then fastener 109 can be moved to the position illustrated in FIG. 7 to lock with conduit 42 securing mechanism 95 to secure conduit end 94 in its certain desired axial position with housing 33. This is accomplished simply in a quick and effective manner, saving substantial assembly costs, reducing assembly errors, and improving product quality.

Of course, it can be seen that conduit 42 can be readily removed axially from housing 33 by merely moving fastener 109 to its unlocking position when desired. The fastener member 109 head 111 external surface 112 may be provided with a suitable recess or indentation 113 to permit rotation of fastener member 109 to its locking and unlocking positions with a suitable screwdriver, such as a Phillips head screwdriver or the like.

Pilot fuel conduit 45 is preferably formed of metallic material. It has an end 114 adapted to be secured in outlet opening 43 in a simple, quick, and effective manner similar to main fuel conduit 42 end 94, previously described.

Figure 9:
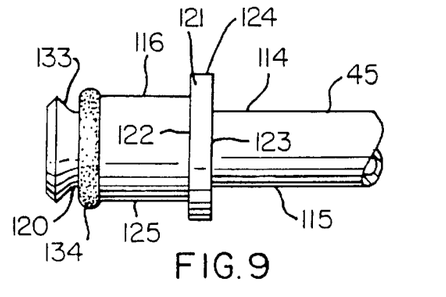
FIG. 9 is an enlarged fragmentary side view of the end portion of the pilot burner conduit.
Figure 10:
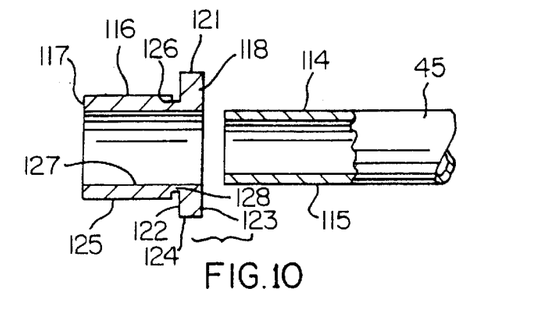
FIG. 10 is an exploded fragmentary view of two of the parts of the end portion of the pilot burner conduit before assembly together, partially in cross section.
Figure 11:
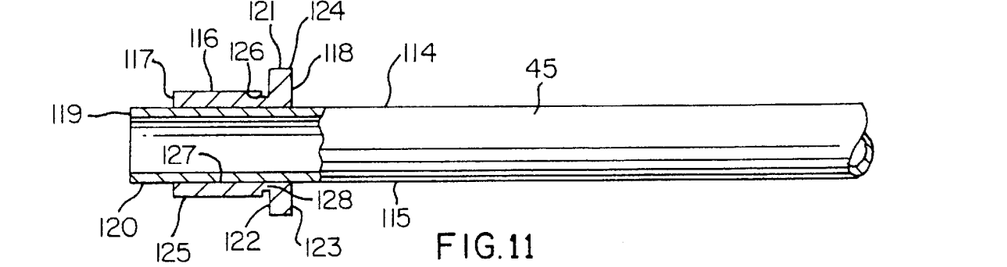
FIG. 11 is a view similar to FIG. 10 illustrating the two parts of FIG. 2 as assembled.
Figure 14:
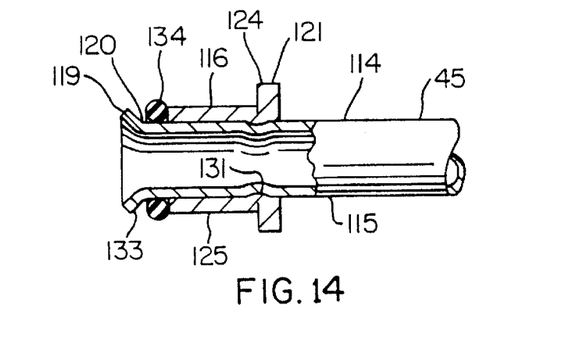
FIG. 14 is a view similar to FIG. 13 illustrating an O-ring assembled to the parts of FIG. 13.

In particular, it can be seen in FIGS. 9 and 14 that pilot fuel conduit 45 has a generally cylindrical external peripheral surface 115. A metallic sleeve 116 is telescoped thereon as illustrated in FIG. 11 so that opposed ends 117 and 118 of sleeve 116 are both respectively disposed inboard of an outer free end 119 of conduit 45 as illustrated in FIG. 11. This configuration defines an annular section 120 of conduit 45 that is disposed outboard of adjacent end 117 of sleeve 116.

Sleeve 116 includes an end 118 defining an outward directed annular flange 121 having opposed flat sides 122 and 123. The side 123 defines end 118 as illustrated in FIG. 11. Annular flange 121 has an outer peripheral surface 124 extending radially outward from an external peripheral surface 125 of sleeve 116 as illustrated. An annular groove 126 is formed in sleeve 116, adjacent flat side 122 of flange 121. The groove 126 does not extend completely through sleeve 116 to an internal peripheral surface 127 thereof. Groove 126 defines an annular band 128 of material of sleeve 116 intermediate external peripheral surface 125 and flange 121 as illustrated in FIG. 11.

Figure 12:
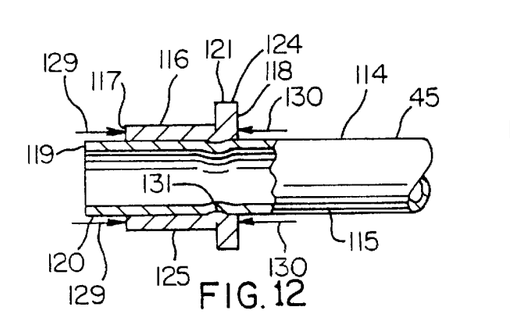
FIG. 12 is a view similar to FIG. 11 illustrating the parts of FIG. 11 secured together.
Figure 13:
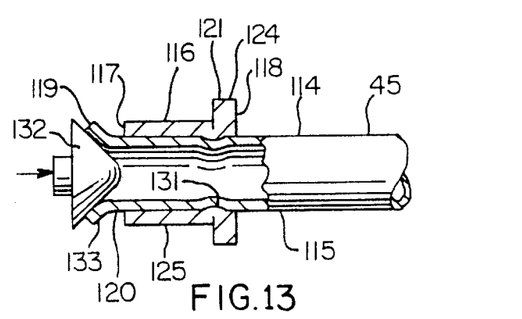
FIG. 13 is a view similar to FIG. 12 illustrating the flared end of the pilot burner conduit.

Conduit 45 and sleeve 116 are formed of a suitable metallic material, such as aluminum, so that sleeve 116 opposed ends 117 and 115 can subsequently be forced toward each other as represented by the respective arrows 129 and 130 in FIG. 12. This substantially closes annular groove 126 and deforms radially inward band 128 of material of sleeve 116 into conduit 45. This is accomplished in the manner provided by another annular groove 131 about conduit 45 to secure sleeve 116 on conduit 45 as illustrated in FIG. 12. Thereafter, a suitable flaring tool 132 can be introduced into the open free end 119 of conduit 45 to provide free end 119 with an outward flare 133 as illustrated in FIG. 13.

A sealing O-ring 134 is to be disposed on section 120 of conduit 45 intermediate end 119 flare 133 and end 117 of sleeve 116. O-ring 134 is in sealing relationship with surface 115 of the conduit 45.

In an illustrative embodiment of sleeve 116 according to the present invention, groove 126 is initially formed in sleeve 116 from about 0.015 to about 0.020 inches in width. It extends through sleeve 116 from approximately one-third to one-half the thickness thereof. It has been found that it will sufficiently deform portion 131 of conduit 45 to secure sleeve 116 thereto. However, it is to be understood that sleeve 116 could be secured to conduit 45 in any other suitable manner, if desired. It can be seen that end 114 annular flange 121 becomes a securing mechanism similar to flange 95 of conduit 42 as previously described.

In FCU 32, housing 33 outlet opening 43 is stepped to define three sections 135, 135, and 137 of housing 33. Sections 135 and 136 are substantially cylindrical and define an annular flat shoulder 138 therebetween. Section 137 is substantially frusto-conical as illustrated.

Figure 8:
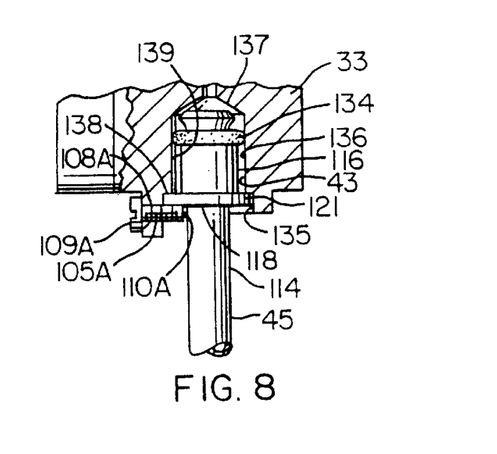
FIG. 8 is an enlarged fragmentary cross-sectional view illustrating the pilot burner fuel conduit secured to the fuel control valve unit housing.

Sections 135 and 136 in housing 33 are dimensioned such that when conduit 45 end 114 is moved axially from a position outside housing 33, as illustrated in FIG. 4, to a certain desired axial position where O-ring 134 is received in the cylindrical section 136 (so as to be in sealing relationship with the internal peripheral surface 139 thereof) and annular flange 121 is received in cylindrical section 135, disposed against annular shoulder 139 (as illustrated in FIG. 8), another threaded fastener 109A can then be turned in threaded opening 105A in housing 33 to position shank portion 108A free end 110A fastener 109A against the end or side 118 of flange 121 as illustrated in FIG. 8. This locks conduit 45 end 114 in the desired axial position in fuel outlet opening 43 similar to fastener 109 locking conduit 42 end 94 in outlet opening 41 as previously described.

Threaded opening 105A in housing 33, together with threaded fastener 109A thus comprise a securing mechanism for housing 33 that cooperates with securing mechanism 121 of conduit 45 in order to secure them together. Threaded fastener 109A has a position such that it permits pilot conduit 45 to be moved axially from a position outside housing 33 to a certain desired axial position within outlet opening 43. It can then be moved to another position to lock with conduit 45 securing mechanism 121 to maintain it in the certain desired axial position with outlet opening 43. It is thus disposed so that fuel from outlet opening 43 can flow to pilot burner 44 disposed at the other end 140 of conduit 45, all as illustrated in FIG. 1.

Pilot conduit 45 does not require an orienting mechanism with housing 33 as does the alignment slot 101 and cooperating projection 102 for conduit 42 previously described. This is because pilot burner 44 is conventionally fastened to main pilot burner 25, by, for example, the fastening structure 141 illustrated in FIG. 1. This, in turn, is because conduit 45 can only be disposed in one rotational position relative to housing 33 in fuel control system 20 of the present invention when the other end of conduit 45 is fastened to pilot burner 44. Of course, a suitable rotational orienting function can be provided for end 114 of conduit 45 and housing 33, if desired.

Thus, it can be seen that the conduits 42 and 45 can each be readily assembled to housing 33 of the FCU after it has been mounted by its externally threaded shank 34 in spud 35 of water heater 21. Ends 104 and 140 thereof, respectively, can be connected to burners 25 and 44 to complete the assembly illustrated in FIG. 1.

However, it is also to be understood that in place of a threaded shank 34 for FCU 32, it can include the quick-connecting feature set forth U.S. Pat. No. 5,261,438 to Katchka, wherein the shank is merely pushed axially into a locking relation with a spud so that conduits 42, 45 and burners 25, 44 can be preassembled to such a control device. Then, that control device could be axially pushed to its locking position with a spud of the water heater as set forth in Katchka U.S. Pat. No. 5,261,438.

The fitting 73 for thermocouple apparatus 57 forms part of housing 33 when assembled thereto by the threaded relationship 74, 75 as previously set forth. Thus, an end 142 of fitting 73 includes an opening 143 that interrupts it and provides an internally threaded section 144 to admit a prior known and conventional thermocouple indicated by reference numeral 145 in FIGS. 17 and 18. It is assembled in a conventional manner.

Figure 18:
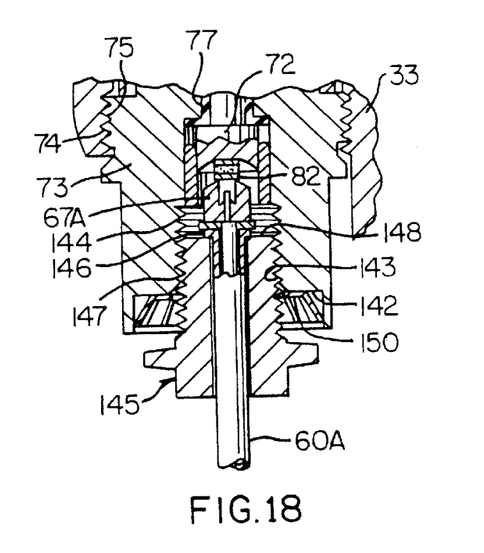
FIG. 18 is a view similar to FIG. 17 illustrating assembly of the prior known thermocouple to the fuel control valve unit housing.

In particular, conventional thermocouple 145 has a rod 60A provided with a contact 67A on flared end 146 of the rod. Contact 67A is adapted to engage against contact 82 when an externally threaded, nut-like fitting 147 is threaded into section 144 a distance sufficient for end 148 of fitting 147 to compact contact 67A against contact portion 82. This is illustrated in FIG. 18. Fitting 147 requires a threading operation to connect thermocouple 145 to FCU 32 housing 33 of this invention.

However, end 58 of thermocouple apparatus 57 is formed to permit it to be simply and axially moved from a position outside housing 33 as illustrated in FIG. 4 to a certain desired axial position in opening 143 of housing 33 so that contact 67 is abutted against contact 82 as illustrated in FIG. 6. A contractible cylindrical securing device 149 of thermocouple apparatus 57 is secured to a securing device 150 on housing 33.

The securing device 150 is a metallic member in the general shape of a washer. It has a flat, inner peripheral section 151 with an opening 152 passing centrally therethrough. It has an outer peripheral edge 153 defined by a plurality of angled fingers 154. Each finger 154 has a free edge 155 adapted to grip an inner peripheral surface 156 of an annular flange 157 which extends outward from the flat end surface 142 of fitting 73. This is illustrated in FIG. 6. The annular flange 157 is preferably an integral part of fitting 73. Securing device 150 may be secured to the housing by a press-fit. Fingers 154 of securing device 150 are press-fit into a recess 158 defined by annular flange 157 until the flat part 151 of the securing device is disposed against flat surface 142 of fitting 73. The edges 155 of fingers 154 abut the internal peripheral surface 156 of flange 157. Edges 155 grip surface 156 to counter movement of securing device 150 from recess 158 and from the position illustrated in FIG. 8.

Securing device 150 thus defines an internal peripheral surface 159 adjacent opening 152, against which outward extending engagement teeth 160 on securing device 149 of the thermocouple apparatus 57 can engage to couple the securing device 149 to securing device 150. This configuration is illustrated in FIG. 6.

Securing device 149 is preferably formed of metallic material. It has a disc-like section 161 provided with a through opening 162 which is telescoped onto rod 60 after a compression spring 163 is telescoped thereon. One end 164 abuts end 146 of rod 60 and another end 165 abuts disc-like section 161, as is illustrated in FIG. 6.

In order to hold securing device 149 against movement on rod 60 away from contact 67 by an excessive distance, rod 60 is subsequently deformed in the area 166 indicated by an arrow to prevent disc-like part 161 from sliding on rod 60 beyond the deformed area 166. In fact, spring 163 is (and remains) under compression when section 161 is disposed against the deformed area 166.

Securing device 149 has two spaced apart spring-like fingers 167 extending from one end of disc section 161 toward contact 67. The fingers 167 extend outwardly, and have a-natural tendency to assume the shape illustrated in FIG. 6, so that when they are forced through opening 152 of securing device 150, they spring outward to cause teeth 160 to define a diameter greater than the diameter of opening 152.

That is, fingers 167 are cammed inward by slanting surfaces 160' of teeth 160 as the free (finger) ends 168 are pushed axially through opening 152 of securing device 150. When the outer edges 169 have passed through opening 152, fingers 167 spring outward as shown in FIG. 6 such that teeth 160 engage inner peripheral edge 159.

Thus, by so dimensioning securing device 149 relative to teeth 160 and the distance from teeth 160 to contacts 82 in fitting 73, compression spring 163 will urge contact 67 into engagement with the contact portion 82 with a certain force when teeth 160 abut the internal peripheral surface 159 of securing device 150. This relationship is illustrated in FIG. 6. The urging force of spring 163 prevents overstressing of the contact structures 67, 82, 85, 84, and 72 while still assuring a certain contact force therebetween when end 58 of thermocouple apparatus 57 is assembled to housing 33.

It can therefore be seen that according to the present invention thermocouple apparatus 57 end 58 can be simply and easily moved from outside of housing 33 to the certain desired axial position in opening 143 (as illustrated in FIG. 4) wherein thermocouple apparatus 57 securing device 149 cooperates with securing device 150 to firmly and effectively join end 58 to housing 33 in the desired position wherein contact 67 is urged with a spring force against contact means 82 of housing 33. It can further be seen that thermocouple apparatus 57 end 58 does not require any particular rotational position relative to housing 33 for assembly. Those persons having ordinary skill in the art will recognize that such rotational orientation can be provided, if so desired.

The other end 172 of thermocouple apparatus 57 carries the thermocouple 59. It is usually attached to pilot burner 44 by suitable connecting structure 171 as is illustrated in FIG. 1. This structure is disclosed in U.S. Pat. No. 4,285,662 to Katchka et al.

Figure 15:
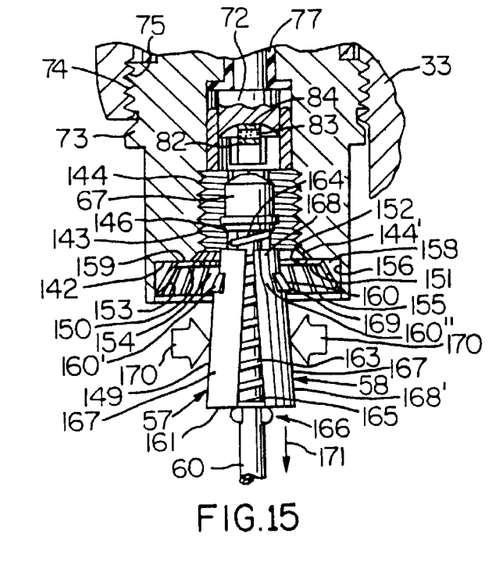
FIG. 15 is a view similar to FIG. 6 illustrating the thermocouple end portion removed from the housing securing structure of the fuel control valve unit.

Should it be necessary to remove thermocouple apparatus 57 from FCU 32 in the field, the service person need merely press inward on fingers 167 of securing device 149 as shown by arrows 170 in FIG. 15 and then axially withdraw securing device 149 from securing device 150 (as illustrated by arrow 171 in FIG. 15). The teeth 160 can then clear the edge of opening 152 of securing device 150 for easy removal. A new thermocouple apparatus 57 can then be inserted into opening 143 as previously described.

Figure 17:
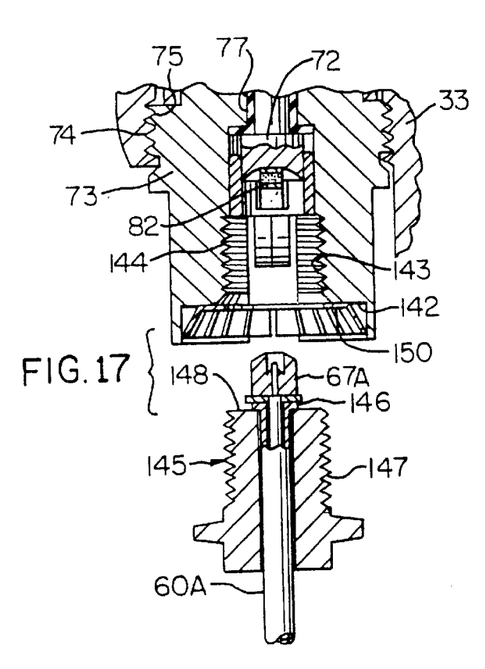
FIG. 17 is an exploded view similar to FIGS. 15 and 16 illustrating a prior known conventional thermocouple assembled to the fuel control valve unit housing.

However, if field service personnel removing the thermocouple apparatus 57 from the fuel control unit only have a replacement thermocouple unit 145 of the conventional type previously known and shown in FIGS. 17 and 18, conventional thermocouple unit 145 can still be used by merely threading fitting 147 into fitting 73 as previously described. This is because fitting 147 readily passes through opening 152 of securing device 150 as illustrated in FIG. 18. Thus, securing device 150 of this invention does not need to be removed if a conventional thermocouple unit 145 is to be utilized with housing 33, using security device 150 mounted to the housing as previously set forth.

Figure 16:
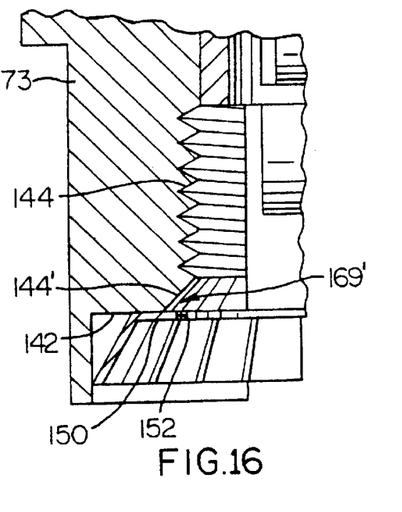
FIG. 16 is an enlarged fragmentary view similar to FIG. 15 illustrating the fuel control valve unit securing structure with the thermocouple removed.

The person having ordinary skill in the art will recognize that thermocouple apparatus 57 and security device 150 can have many suitable dimensions and can be formed of many suitable materials. One working embodiment of the present invention includes a flange 157 having an inside diameter of approximately 0.645 inches in this example, and a chamfer 144' at the end of threads 144. This configuration provides a space 169' adjacent surface 142 having a maximum diameter that is larger than the outside diameter of fitting 73 threads 144, as is illustrated in FIG. 16. It will receive edges 169 of teeth 160 as is illustrated in FIG. 6. The opening 152 of securing device 150 can be provided with a diameter of approximately 0.352 inches in this example. The securing device 150 can be formed of phosphor bronze material or the equivalent; it has threads 144 defining an inside diameter of approximately 0.316 inches in this example. These are to threadedly cooperate with threads 147 of the previously known fitting to define an outside diameter of approximately 0.338 inches in this example.

Securing device 149 of the illustrated embodiment of thermocouple apparatus 57 has fingers 167 defining a first outside diameter of approximately 0.312 of an inch at the upper (free) ends 168 thereof in this example. This example dimension permits ends 168 to be readily received in threaded portion 144 of fitting 73 and defines a larger outside diameter of approximately 0.343 inches at the ends 168' thereof in this example. These dimensions permit the element to be readily received in opening 152 of securing device 150. Fingers 167 of securing device 149 each have a generally truncated conical transition section 160" between upper end 168 and lower end 168'. The respective teeth 160 are lanced at end 169 and deformed outward to cooperate with inner peripheral edge 159 of securing device 150 as previously described. Ends 169 of teeth 160 define an outside diameter of approximately 0.487 inches in this example such that teeth 160 can be readily received in the space 169' as illustrated in the drawings. Each tooth 160 has, for example, a width of about one-eighth of the circumference of fingers 167.

Since the novel thermocouple 57 of this invention can be utilized with a FCU 32 not having the novel conduits 42, 45 of this invention and vice versa, the novel features of thermocouple 57 and the related features of the FCU 32 and system 20 are described and claimed in patent U.S. application, Ser. No. 08/810,515, filed concurrently herewith bearing Robertshaw Controls Company Docket No. 95512.

It can be seen that it is one of the features of this invention is to permit the proper end of a conventional part to be assembled in an opening in the housing of a control unit by merely pushing it into that opening to a certain desired axial position until the securing devices mate together, such as by snap-fitting together, as provided by the thermocouple apparatus 57, or by simply and quickly turning a movable part to its locking position as provided by the threaded fastener 109 9 for conduit 420 or by threaded fastener 109A (for conduit 45). of course, those persons having ordinary skill in the art will recognize that such an axial relation can also be provided by pushing the housing onto the end of the part or pushing the housing and the end toward each other, as otherwise may be desired.

It can be seen further that the present invention not only provides a new fuel control system and a new method of making such a fuel control system, but also this invention provides a new part for such a system and a new method of making such a part.

While the various features of the present invention as illustrated and described are particularly adapted to provide a fuel control system for a water heater using a fuel energy source, it is to be understood that the various features of this invention can be utilized singly or in various combinations to provide a fuel control system for other apparatus as desired. Though examples of the novel structures and methods of the present illustrative embodiment of this invention have been illustrated and described as required by the Patent Statutes, it is to be understood that other structures and method steps can be utilized that are comprehended by the scope of the appended claims. Therefore, this invention is not to be limited solely to the preferred embodiment illustrated in the drawings and description, because the drawings are merely utilized to illustrate one example of the many uses of this invention.

I claim:

1. A fuel control system, comprising:
   a fuel control valve unit including a housing having an exterior and a fuel outlet opening therein and a first securing device associated with the housing;
   means for conveying fuel from the fuel outlet opening to a predetermined location in the system;
   a fuel conduit having an end thereof secured in the fuel outlet opening, the conduit end being positionable in a desired axial position in the fuel outlet opening relative to the housing, the conduit end further including an annular flange disposed circumjacent the conduit end and extending outward therefrom, the flange adapted to cooperate with the first securing device to hold the conduit end in the desired axial position in the housing;
   wherein the first securing device has at least one movable member which in a first position thereof permit the conduit end to be axially moved from a position outside the housing to the desired axial position and which in a second position disposes between the flange and the housing exterior to secure the conduit end in the fuel outlet opening.

2. The fuel control system of claim 1, further including a burner operatively connected to receive fuel from the conduit and adapted to discharge the fuel for burning.

3. The fuel control system of claim 2, further including a water heater for holding water and having a wall, wherein the burner is disposed to heat the water when burning fuel discharged from the burner, and wherein the fuel control valve unit is carried by the wall.

4. The fuel control system of claim 1, further including a water heater for holding water and having a wall, wherein the fuel outlet is a first fuel outlet, the conduit is a first conduit, the fuel control valve unit is carried by the wall, and the burner is a pilot burner, the housing further including a second fuel outlet, and further including a main burner for heating the water when burning fuel discharged from the main burner and a second conduit operatively connected between the main burner and an end of the second conduit connected to receive duel from the main fuel outlet.

5. The fuel control system of claim 4, wherein the second conduit is a main conduit and the first securing device is a main securing device.

6. The fuel control system of claim 1, further including an O-ring seal disposed to sealingly engage the conduit end to the housing in the fuel outlet opening thereof, wherein the housing carries the O-ring seal.

7. The fuel control system of claim 1, further including an O-ring seal disposed to sealingly engage the conduit end to the housing in the fuel outlet opening thereof, wherein the conduit end carries the O-ring seal.

8. The fuel control system of claim 1, wherein the housing further includes first orienting means and the conduit end includes second orienting means cooperating with the first orienting means to prevent rotational movement of the conduit relative to the housing.

9. The fuel control system of claim 2, wherein the first securing device includes a threaded member having a free end and the housing has a threaded opening leading to the conduit end and threadedly receiving therein part of the threaded member.

10. The fuel control system of claim 9, wherein the annular flange is a unitary part of the conduit.

11. The fuel control system of claim 10, wherein the annular flange is a sleeve telescoped onto the conduit and secured thereto.

12. The fuel control system of claim 11, wherein the sleeve has opposing first and second sleeve ends and inner and outer peripheral surfaces, and a peripheral groove in the outer surface.

13. The fuel control system of claim 11, wherein the sleeve has opposing first and second sleeve ends and inner and outer peripheral surfaces, and an annular groove in the outer surface, wherein the annular groove is at least partially closed by deforming compressive forces applied at the opposing first and second ends.

14. The fuel control system of claim 13, wherein the conduit end is a first end and the conduit further includes a free second end extending away from the first and second sleeve ends to define an annular section between the second end and the sleeve near the second end, further including an O-ring seal carried on the annular section and sealing the annular section to the housing in the fuel outlet opening.

15. The fuel control system of claim 14, wherein the second end is flared radially outward to engage the O-ring seal between the adjacent end of the sleeve and the flare of the second end.

16. A fuel control valve unit for a fuel control system, comprising a housing having a fuel outlet opening therein for receiving an end of a fuel conduit adapted to convey fuel from the fuel outlet opening to a predetermined location in the system, the conduit end being adapted to be in a certain axial position in the fuel outlet opening relative to the housing, the housing having a first securing device for cooperating with an annular flange disposed circumjacent the conduit end and extending outward therefrom to secure the conduit end and the housing together in the certain axial position thereof, wherein the first securing device has at least one movable part which, in a first position thereof is adapted to permit the conduit end to be axially moved from a position outside the housing to the certain axial position and which in a second position is adapted to cooperate with the flange to secure the conduit end in the certain axial position thereof, wherein the flange has first and second sides, the first side abutting against the housing and the moveable part abutting against the second side in order to secure the conduit within the housing when the moveable part is in the second position.

17. A conduit having a sleeve at an end thereof to be secured to a device, wherein the sleeve is telescoped onto the conduit and secured thereto, wherein the sleeve has opposing ends and inner and outer peripheral surfaces, the sleeve further having an annular groove in its outer peripheral surface substantially closed by deforming compressive forces applied at the opposing ends to secure the sleeve to the conduit, wherein the conduit has a free end extending away from the ends of the sleeve to define an annular section between the free end and the end of the sleeve adjacent the free end, and further including an O-ring seal carried on the annular section, and wherein the free end is flared radially outward to hold the O-ring between the adjacent end of the sleeve and the flare of the free end.

18. A method of making a fuel control system including a fuel valve unit having a housing with a fuel outlet opening therein, and a fuel conduit having an end secured in the fuel outlet opening for conveying fuel from the outlet opening to a predetermined location in the system, wherein the conduit end is disposed in a certain axial position in the fuel outlet opening relative to the housing, the housing has a first securing device, the conduit end has a second securing device cooperating with the first securing device to secure the conduit end and the housing together in the certain axial position, the second securing device including a flange disposed circumjacent the conduit end and extending outward therefrom, comprising the act of forming the first securing device to include at least one movable part which in a first position permits the conduit end to be axially moved from a position outside the housing to the certain axial position and which in a second position abuts against the flange to secure the conduit end in the certain axial position.

19. A method of making a conduit having an end to be secured to a device, the conduit having a sleeve on the end thereof, comprising the steps of telescoping the sleeve onto the conduit, forming the sleeve to include opposing ends and inner and outer peripheral surfaces, forming on the sleeve an annular groove in the peripheral surface thereof, closing the groove by applying a deforming compressive force to the opposing ends and forming an adjacent annular part of the inner peripheral surface thereof to deform into the conduit and thereby secure the sleeve to the conduit, forming the conduit to have a free end extending away from the opposing ends to define an annular section between the free end and the end of the sleeve adjacent the free end, disposing a sealing O-ring on the annular section, and then flaring the free end of the conduit radially outward to hold the O-ring seal between the adjacent end and the flare of the free end.

20. A fuel control valve unit for a fuel control system, comprising:
    (a) a housing having a fuel outlet opening therein, the outlet opening defining first and second stepped cylindrical sections that define an annular shoulder between the first and second sections; and
    (b) a conduit having a conduit end adapted to be inserted into the fuel outlet opening for conveying heating gas from the fuel outlet opening to a predetermined location in the system, the conduit end having a free end and an annular flange spaced inward from the free end, the annular flange extending radially outward from the conduit end, wherein the shoulder limits the insertion distance of the free end by detaining the flange when the free end is inserted into the fuel outlet opening;
    (c) the housing additionally including a first securing device that has at least one movable member adapted to be moved in (1) a first position to permit the free end to be axially inserted into the fuel outlet opening to the certain axial position, and (2) a second position to secure the conduit end in the certain axial position, wherein the moveable member abuts against the flange in the second position.

* * * * *